(12) United States Patent
Lee et al.

(10) Patent No.: US 7,158,288 B2
(45) Date of Patent: Jan. 2, 2007

(54) LONG-WAVELENGTH-BAND GAIN-CONTROLLED OPTICAL AMPLIFIER

(75) Inventors: Han Hyub Lee, Daejeon (KR); Donghan Lee, Daejeon (KR); Hee Sang Chung, Daejeon (KR); Hyun Jae Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 120 days.

(21) Appl. No.: 10/896,347

(22) Filed: Jul. 20, 2004

(65) Prior Publication Data

US 2005/0099675 A1   May 12, 2005

(30) Foreign Application Priority Data

Nov. 11, 2003   (KR) .............. 10-2003-0079604

(51) Int. Cl.
*H01S 3/00* (2006.01)

(52) U.S. Cl. ............................... 359/341.32

(58) Field of Classification Search ............ 359/341.32
See application file for complete search history.

(56) References Cited

U.S. PATENT DOCUMENTS

| | | | | |
|---|---|---|---|---|
| 6,222,670 B1 * | 4/2001 | Ryu et al. | ............... | 359/345 |
| 6,330,384 B1 * | 12/2001 | Ryu et al. | ............... | 385/39 |
| 6,437,907 B1 * | 8/2002 | Yoon et al. | ............... | 359/341.32 |
| 6,646,796 B1 * | 11/2003 | Song et al. | ............... | 359/349 |
| 6,674,570 B1 * | 1/2004 | Song et al. | ............... | 359/349 |
| 6,867,912 B1 * | 3/2005 | Hwang et al. | ............... | 359/349 |
| 6,882,466 B1 * | 4/2005 | Shimojoh et al. | ............... | 359/334 |
| 6,903,868 B1 * | 6/2005 | Hwang et al. | ............... | 359/349 |
| 6,972,897 B1 * | 12/2005 | Song et al. | ............... | 359/349 |
| 6,972,898 B1 * | 12/2005 | Hwang et al. | ............... | 359/349 |
| 6,975,450 B1 * | 12/2005 | Hwang et al. | ............... | 359/349 |
| 6,980,356 B1 * | 12/2005 | Lee | ............... | 359/341.41 |
| 2002/0003655 A1 | 1/2002 | Park et al. | ............... | 359/341.1 |
| 2002/0176451 A1 * | 11/2002 | Lee et al. | ............... | 372/6 |
| 2003/0123141 A1 * | 7/2003 | Yeniay | ............... | 359/349 |
| 2003/0133183 A1 * | 7/2003 | Yeniay et al. | ............... | 359/349 |
| 2004/0042066 A1 * | 3/2004 | Kinoshita et al. | ............... | 359/341.41 |
| 2004/0233516 A1 * | 11/2004 | Hwang et al. | ............... | 359/349 |
| 2004/0233517 A1 * | 11/2004 | Song et al. | ............... | 359/349 |
| 2004/0233518 A1 * | 11/2004 | Song et al. | ............... | 359/349 |
| 2004/0240045 A1 * | 12/2004 | Lee et al. | ............... | 359/349 |

FOREIGN PATENT DOCUMENTS

| | | |
|---|---|---|
| KR | P2000-0053596 | 8/2000 |
| KR | 010036154 A | 5/2001 |
| KR | 1020030075295 | 9/2003 |

OTHER PUBLICATIONS

Weik, Martin. Fiber Optics Standard Dictionary. 3rd Edition. 1997. p. 594.*

(Continued)

*Primary Examiner*—Deandra M. Hughes
(74) *Attorney, Agent, or Firm*—Blakely Sokoloff Taylor & Zafman

(57) ABSTRACT

A long-wavelength band (L-band) optical amplifier capable of maintaining a gain constant, thereby providing a stable optical output even when an optical power or a wavelength of a signal input thereto changes. The optical amplifier includes an amplifier which amplifies an input signal, and an amplified spontaneous emission (ASE) reflector which reflects backward ASE generated by the amplifier so that the backward ASE is fed back to the amplifier.

8 Claims, 7 Drawing Sheets

OTHER PUBLICATIONS

Harun et al. Gain Clamping in L-Band Erbium-Doped Fiber Amplifier Using a Fiber Bragg Grating. IEEE Photonics Technology Letters, vol. 14, No. 3, Mar. 2002.*

IEEE Photonics Technology Letters, vol. 14, No. 9, Sep. 2002, pp. 1258-1260.

Journal of the Optical Society of Korea, vol. 7, No. 2, Jun. 2003, pp. 67-71.

IEEE Photonics Technology Letters, vol. 14, No. 3, Mar. 2002, pp. 293-295.

H.B. Choi et al. / Optics Communications 213 (2002) 63-66.

* cited by examiner

LONG-WAVELENGTH-BAND GAIN-CONTROLLED OPTICAL AMPLIFIER

BACKGROUND OF THE INVENTION

This application claims the priority of Korean Patent Application No. 2003-79604, filed on Nov. 11, 2003, in the Korean Intellectual Property Office, the disclosure of which is incorporated herein in its entirety by reference.

1. Field of the Invention

The present invention relates to an optical amplifier used for optical communication, specifically, to a long-wavelength band (L-band) optical amplifier (where an L-band ranges from 1570 nm to 1610 nm) capable of maintaining a constant gain by using a backward amplified spontaneous emission, thereby providing a stable optical output power independent of a power or a wavelength of an input signal.

2. Description of the Related Art

An L-band optical amplifier is expected to be widely used in a wavelength division multiplexing (WDM) transmission system as well as in a metro WDM transmission system. In an L-band optical amplifier used in such transmission systems, it should be transient-free under abrupt changes in input power or number of channels.

However, the gain of an L-band optical amplifier is reported to be different depending on the wavelength of the input signal, although the power of the signal is the same. This gain difference comes from the low gain coefficient in the L-band, significantly long erbium-doped fiber (EDF) and consequent strong backward amplified spontaneous emission (ASE), which saturates the gain in the front section of an L-band optical amplifier. The gain difference of an L-band optical amplifier may cause an optical output to change greatly.

Pump-controlled optical amplifiers employing feed-forward schemes are widely used in the C-band (1530 nm~1565 nm). Typically, the total input power, irrespective of signal wavelength, is detected in front of the optical amplifier and then the pump power is adjusted to the corresponding preset value. This method is simple to incorporate and fast in control, compared to a feed-back scheme in which the intrinsically slower process can induce the higher gain transients in the surviving channels. However, since a conventional pump-controlled L-band optical amplifier uses the same pump power for the same input power independent of a wavelength of an input signal, it is difficult to control a change in an output power caused by a gain difference depending on the wavelength of the input signal. Consequently, transients from conventional L-band optical amplifiers may be great.

SUMMARY OF THE INVENTION

The present invention provides an amplifier for maintaining a constant gain independent of a wavelength of an input signal.

According to an aspect of the present invention, there is provided an optical amplifier comprising a pump light source which generates pump light, a wavelength division multiplexer which multiplexes an input optical signal with the pump light, an optical fiber which amplifies the input optical signal using the pump light generated by the pump light source, and a fiber Bragg grating which reflects backward amplified spontaneous emission (ASE) generated by the optical fiber to be re-injected to the optical fiber.

According to another aspect of the present invention, there is provided an optical amplifier comprising a pump light source which generates pump light; a wavelength division multiplexer which multiplexes an input optical signal with the pump light; an optical fiber which amplifies the input optical signal using the pump light; a reflecting mirror; and a C/L-band coupler which comprises a C-band port and an L-band port, wherein a C-band signal transmits through the C-band port and an L-band signal transmits through the L-band port. The L-band port is connected to the input optical signal, and the C-band port is connected to the reflecting mirror. Here, backward amplified spontaneous emission (ASE) generated by the optical fiber travels to the reflecting mirror via the C/L-band coupler and is then reflected by the reflecting mirror to be re-injected to the optical fiber.

According to still another aspect of the present invention, there is provided an optical amplifier comprising a pump light source which outputs pump light; a wavelength division multiplexer which multiplexes an input optical signal with the pump light; an optical fiber which amplifies the input optical signal using the pump light; a C/L-band coupler which comprises a C-band port and an L-band port, wherein a C-band signal passes through the C-band port and an L-band signal passes through the L-band port; and a circulator which is provided between the C/L-band coupler and the wavelength division multiplexer. Here, backward amplified spontaneous emission (ASE) generated by the optical fiber is inputted to the C-band port of the C/L-band coupler via the wavelength division multiplexer and the circulator and then output through a common port of the C/L-band coupler to be re-injected to the optical fiber via the circulator.

According to still another aspect of the present invention, there is provided an optical amplifier comprising an amplifier which amplifies an input optical signal, and an amplified spontaneous emission (ASE) reflector which reflects backward ASE generated by the amplifier so that the backward ASE is re-injected to the amplifier. Preferably, the optical amplifier further comprises a coupler which divides and outputs a power of the input signal at a predetermined ratio, and a drive unit which receives a power of the input signal divided by the coupler and adjusts a power of pump light provided to the amplifier according to a power of the received power of the input signal.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Like a C-band optical amplifier, an output power of an L-band optical amplifier changes when a power of an input signal changes. However, unlike the C-band optical amplifier, the gain of an L-band optical amplifier is reported to be different depending on the wavelength of the input signal, although the power of the signal is the same. This gain difference comes from the low gain coefficient in the L-band, significantly long erbium-doped fiber (EDF) and consequent strong backward amplified spontaneous emission (ASE), which saturates the gain in the front section of an L-band optical amplifier.

Here, if the amount of backward ASE is maintained constant, a constant gain of an L-band optical amplifier can be obtained independent of a wavelength of an input signal.

To maintain the amount of backward ASE constant even if an input wavelength changes, the present invention uses a means for reflecting backward ASE to an input port of an L-band optical amplifier so that the backward ASE can be re-injected to an optical fiber. In addition, the present invention provides an L-band optical amplifier which performs feed-forward pump control in which pump power is controlled according to a power of input signal, thereby maintaining a constant gain independent of a power or wavelength of an input signal. According to the present invention, an input signal wavelength dependent transient can be suppressed.

Figure 1:
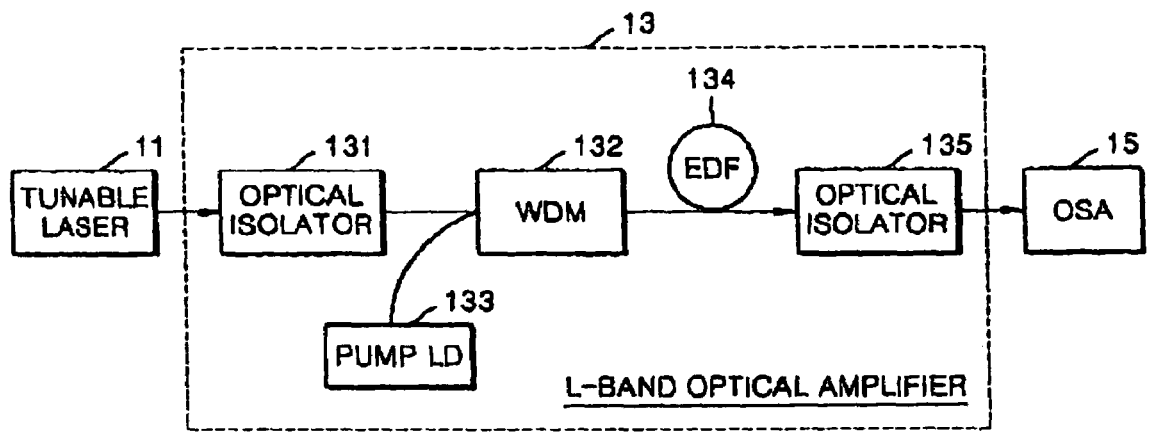
FIG. 1 shows a setup which measures an output of a conventional long-wavelength band (L-band) optical amplifier.

FIG. 1 shows a setup which measures an output of a conventional L-band optical amplifier when a single optical signal is input. A conventional L-band optical amplifier 13 includes optical isolators 131 and 135, a wavelength division multiplexer (WDM) 132, a pump laser diode (LD) 133, and an erbuim-doped fiber (EDF) 134, The optical isolator 131 at an input port prevents reflection of a backward ASE from the EDF 134, or reflected signal from within the optical amplifier itself. The optical isolator 135 at an output port prevents reflection of forward ASE or amplified signal.

The WDM 132 multiplexes an input signal and pump light generated by the pump LD 133. The EDF 134 amplifies a power of an input signal by using a power of pump light generated by the pump LD 133. A tunable laser 11 may be used to process an L-band optical signal having different wavelengths. An optical spectrum analyzer (OSA) 15 is used to 13 to measure an optical power of an amplified signal as a wavelength of an input signal.

Figure 2:
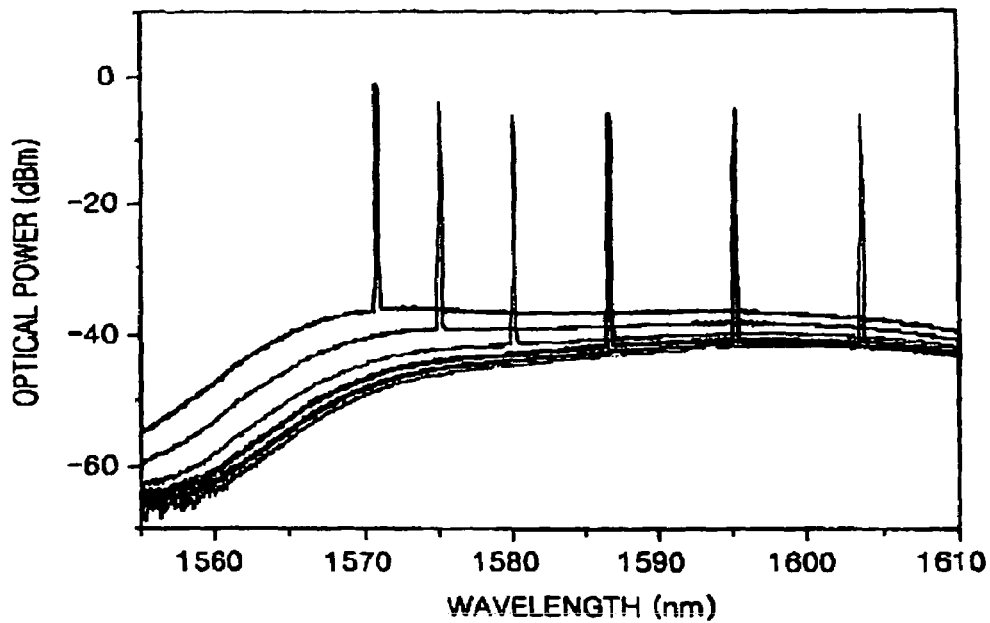
FIG. 2 illustrates optical spectra obtained as an input wavelength.

FIG. 2 illustrates optical spectra of output light obtained using the setup shown in FIG. 1 when wavelengths of input signal are 1570.8, 1575.0, 1580.0, 1586.6, 1595.0, and 1603.6 nm, respectively. Here, each power of input signal is −18 dBm and the power of the 1480 nm pump LD is 46 mW. Referring to FIG. 2, as the wavelength of input signal increased, the output power decreased. In other words, as the wavelength of input signal having constant power increases, an amplification rate (i.e., a gain) decreases. Referring to FIG. 2, the wavelength dependent gain difference is 5.3 dB.

As is seen from FIG. 2, using a typical feed-forward pump control method may cause a problem. In other words, when a method of adjusting a power of pump LD based on a power of input signal is used, since same pump power is generated as the same power of the input signal independent of a wavelength of an input signal, an output power greatly changes depending on a wavelength of an input signal.

Figure 3:
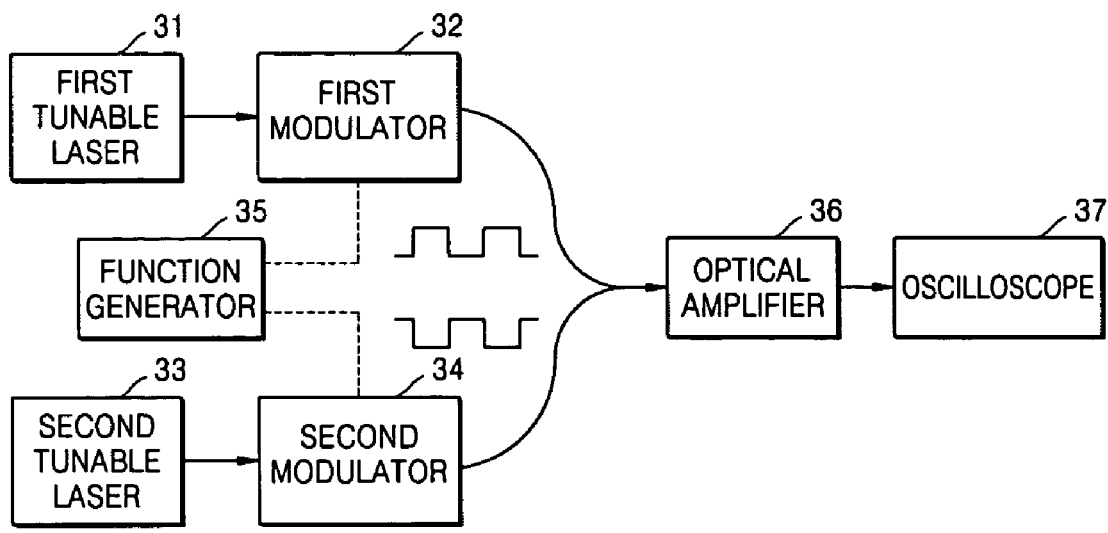
FIG. 3 shows a setup which measures transient from an optical amplifier.

FIG. 3 shows a setup which measures transient from an L-band optical amplifier. Transient response indicates characteristics appearing when output power instantaneously changes due to a sudden change in a power of an input signal or a wavelength of an input signal. First and second tunable lasers 31 and 33 output optical signals having different wavelengths, respectively. First and second modulators 32 and 34 respectively modulate the optical signals received from the respective first and second tunable lasers 31 and 33 in response to an electrical signal generated by a function generator 35. The first and second modulators 32 and 34 respectively modulate the optical signals based on square waves, which are generated by the function generator 35 with a predetermined period, so that, the modulated optical signals have a phase difference of 180 degrees. For example, while the first modulator 32 is modulating an optical signal from the first tunable laser 31 and outputting the modulated optical signal, the second modulator 34 outputs no signal. Accordingly, two optical signals having different wavelengths are alternately and periodically input to an optical amplifier 36. Output power of an optical amplifier is measured using an oscilloscope 37.

Figure 4:
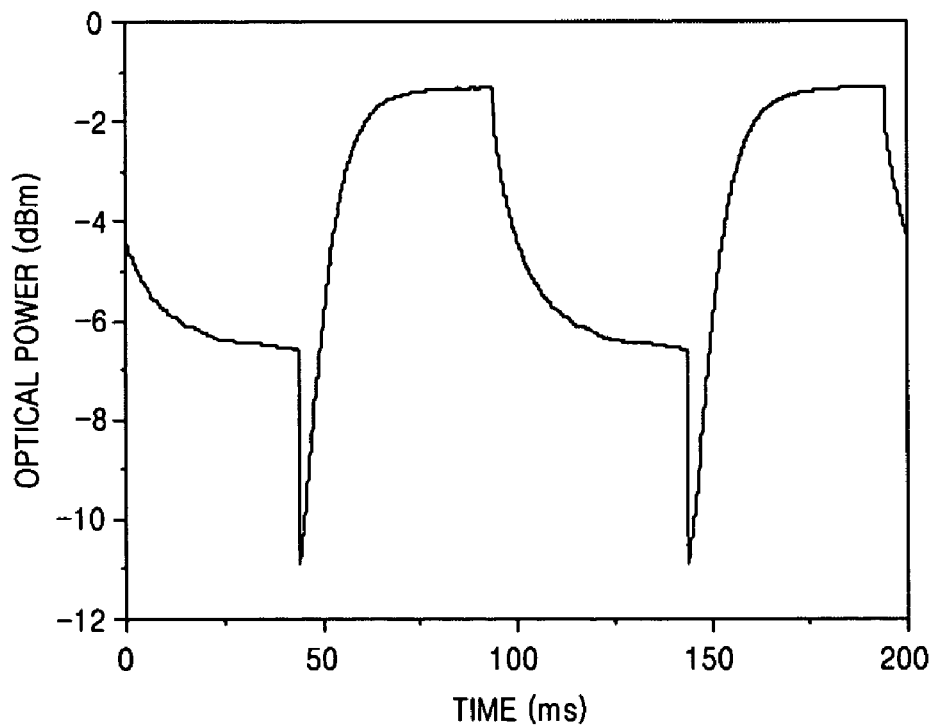
FIG. 4 is a graph illustrating results of measuring transient from a conventional L-band optical amplifier.

FIG. 4 is a graph illustrating results of measuring characteristics of the conventional L-band optical amplifier shown in FIG. 1 using the setup shown in FIG. 3. Here, both wavelengths of input signals are 1570.8 nm and 1603.6 nm, respectively. The power of each signal is −18 dBm. Input signals are alternately turned on (or off) at time intervals of 50 ms. A gain difference between input signals is 5.3 dB in the graph shown in FIG. 2. Referring to FIG. 4, an entire gain difference with transient between input signals is about 9.5 dB. If output light greatly changes when a wavelength of input signal instantaneously changes, as described above, transmission errors may occur in an optical transmission system.

To overcome this problem, feedback pump control methods can be used. In such methods, a power of an input signal and an output signal are detected and compared with each other, and a power of pump LD is adjusted until desired output power is obtained. However, as the number of feedbacks increases, a time delay occurs in an operation of an electronic circuit. Consequently, it is difficult to completely suppress an instantaneous change in output power.

An embodiment of the present invention provides a gain control method by which an instantaneous change in output power due to changes in a power and a wavelength of input signal can be minimized in an L-band optical amplifier.

A change in a power of input signal indicates a change in the number of channels in a wavelength division multiplexed (WDM) transmission system. It is preferably controlled using a feed-forward pump controlled method. However, a change in an output power depending on wavelength of input signal is difficult to be controlled using the conventional feed-forward pump controlled method. This is because, as described above, same pump power is used for an input signal independent of a wavelength of the input signal.

It may be inferred that backward ASE occurring in a gain medium, i.e., EDF causes output power to change when a wavelength of input signal changes. An embodiment of the present invention provides an L-band amplifier which completely controls a gain independent of a power and a wavelength of an input signal by using a method of effectively suppressing backward ASE and a feed-forward method.

Figure 5:
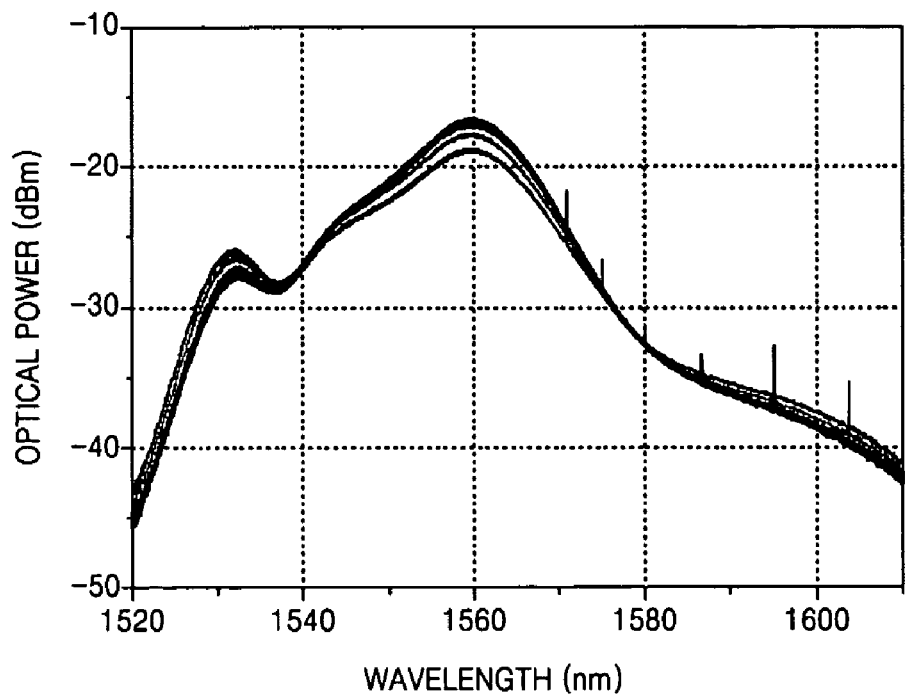
FIG. 5 illustrates spectra of backward amplified spontaneous emission (ASE) as a wavelength and an input power.

FIG. 5 is a graph illustrating results of measuring backward ASE as the input wavelengths and power, which were used in the measurement described with reference to FIG. 2, using an OSA. In other words, a 2×1 coupler was used between the optical isolator 131 and the WDM 132 to measure a power of light traveling in a direction opposite to an advancing direction of an input signal. Here, a reflected power of an input signal is also measured together with the backward ASE.

It can be inferred from FIG. 5 that as a wavelength of an input signal increases, the backward ASE also increases. In this situation, a power of the pump LD expected to amplify an input signal within EDF is used to amplify backward ASE. As a result, amplification of the input signal is reduced. The tendency becomes more critical as a power of the input signal is less, and particularly, when only one channel is input to an optical amplifier.

To overcome this problem, in embodiments of the present invention, backward ASE is re-injected to EDF to reduce pump power taken by the backward ASE so that more pump power can be used to amplify an input signal. When backward ASE is re-injected to EDF, backward ASE occurring in the EDF is suppressed, and thus an input signal is greatly amplified. Such phenomenon would be quantitatively analyzed by expanding an equation but can be proved through an experimental method.

Figure 6:
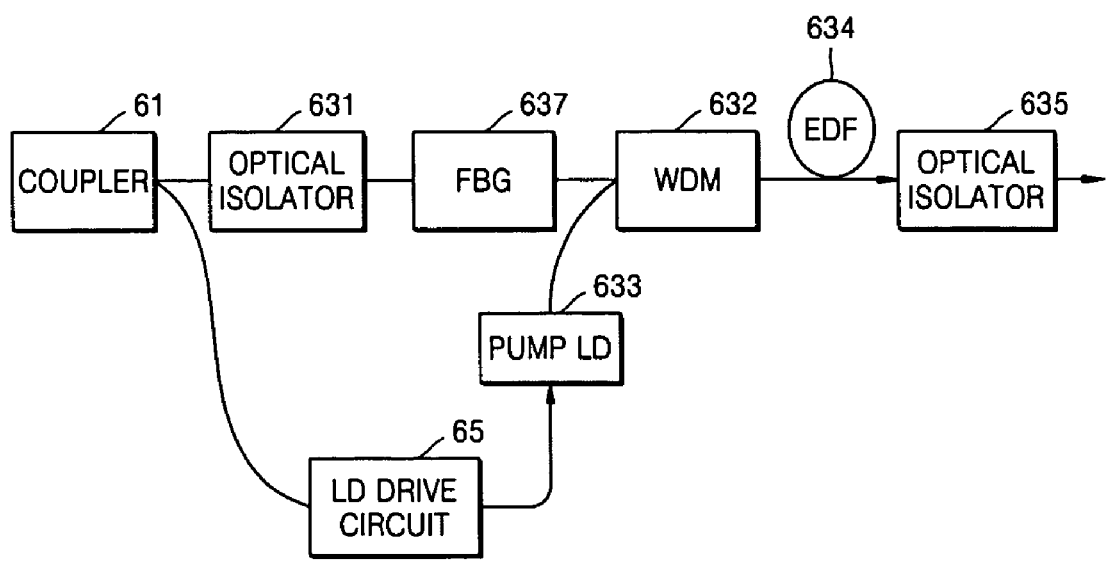
FIG. 6 is a block diagram of an L-band optical amplifier according to a first embodiment of the present invention.

FIG. 6 is a block diagram of an L-band optical amplifier according to a first embodiment of the present invention. Optical isolators 631 and 635, a WDM 632, an EDF 634, and a pump LD 633 have the same functions as those of the conventional L-band optical amplifier shown in FIG. 1, and thus a description thereof will be omitted.

A coupler 61 divides a power of an input signal at a predetermined ratio, for example, 90:10, 95:5, 98:2, or 99:1. The optical signal output from the coupler 61 is incident into the optical isolator 631, and the divided optical signal is inputted into an LD drive circuit 65. The optical signal incident into the LD drive circuit 65 is detected by a photo diode within the LD drive circuit 65 and is converted into an electrical signal. The power of pump LD 633 is adjusted to the electrical signal.

A fiber Bragg grating (FBG) 637 is used to re-inject backward ASE to the EDF 634. The FBG 637 is an optical element formed by patterning a periodic grating on an optical fiber. The FBG 637 periodically changes a refractive index and reflects light having a specially fixed wavelength. For example, when an FBG with center wavelength of 1559 nm inserted to the EDF 634, the FBG transmits all the signal of L-band with little loss (<0.5 dB) and just reflects C-band backward ASE at 1559 nm.

Figure 7:
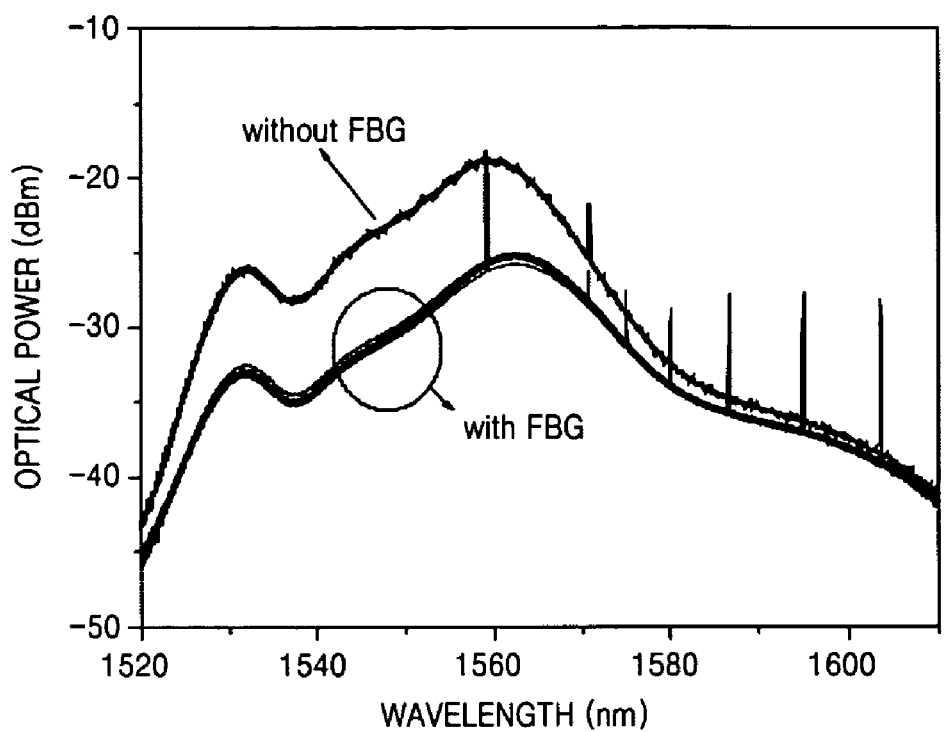
FIG. 7 illustrates spectra of backward ASE in the L-band optical amplifier shown in FIG. 6.

FIG. 7 illustrates an optical spectra of backward ASE measured in the FBG-inserted L-band optical amplifier shown in FIG. 6. To compare a L-band optical amplifier with the FBG 637 with one without the FBG 637, the spectrum of backward ASE with respect to an input signal having a wavelength of 1570.8 nm shown in FIG. 5, which is measured in the L-band optical amplifier without FBG, is also illustrated in a graph shown in FIG. 7. An optical power of backward ASE is lower in the amplifier with the FBG 637 than in the amplifier without the FBG 637 throughout the entire wavelength. In addition, in the case with the FBG 637, backward ASE rarely changes even if a wavelength of an input signal changes, in contrast with the case without the FBG 637 where a gain difference is great as shown in FIG. 5.

In other words, when the FBG 637 is inserted at an input port of the L-band optical amplifier, since a portion of reflected backward ASE is re-injected to the EDF 634 by the FBG 637, total optical power of the input signal increases.

Accordingly, when the FBG 637 is used, the power of backward ASE is greatly decreased, so that a gain of L-band optical amplifier can be maintained constant independent of a wavelength of an input signal.

Figure 8:
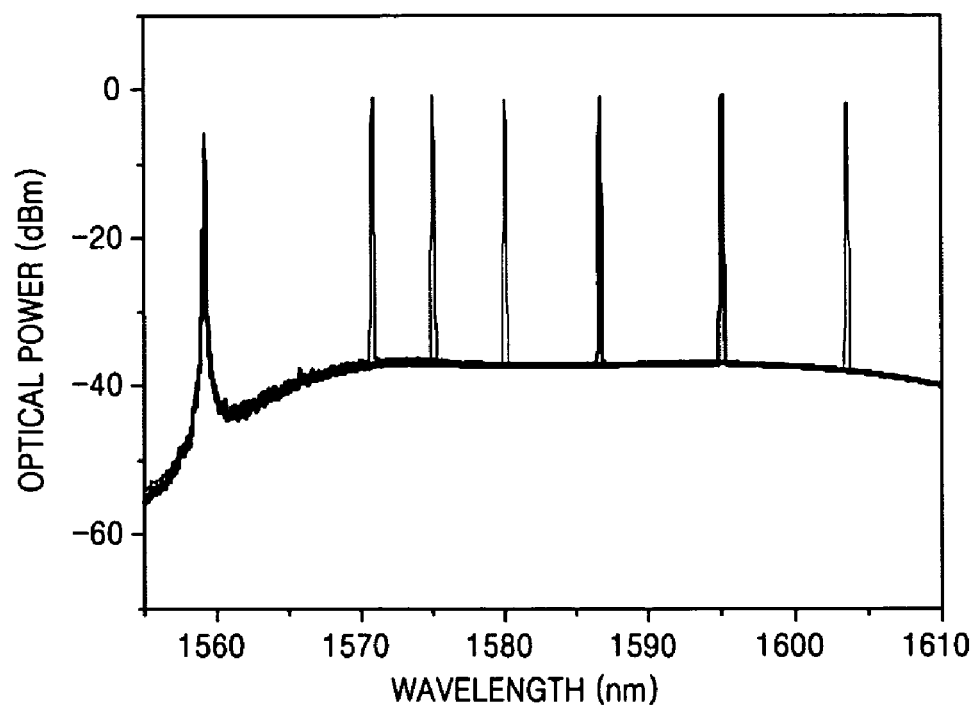
FIG. 8 illustrates output spectra in the fiber Bragg grating (FBG)-inserted L-band optical amplifier shown in FIG. 7.

FIG. 8 illustrates output spectra in the FBG-inserted L-band optical amplifier shown in FIG. 7. As is expected from uniform backward ASE, an output power is very uniform independent of a wavelength of an input signal. The power difference is about 0.8 dB which is very small when considering that a difference between the shortest and the longest wavelengths is 33 nm. The power difference of the L-band optical amplifiers without the FBG 637 (see FIG. 2) is 5.3 dB. In the first embodiment of the present invention, 1480-nm pump power is 37 mW. But, 1480-nm pump power of the L-band optical amplifiers without the FBG 637 is 46 mW. Thus, uniform output power can be obtained with less pump power in the first embodiment of the present invention.

Figure 9:
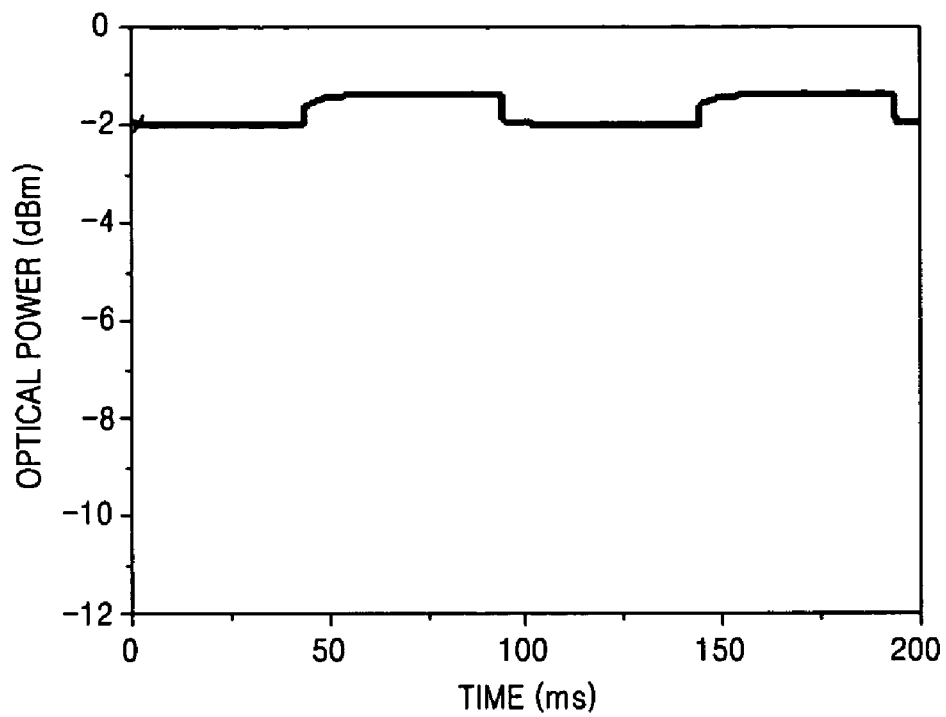
FIG. 9 is a graph illustrating results of measuring transients from the L-band optical amplifier shown in FIG. 6.

FIG. 9 is a graph illustrating results of measuring transients from the L-band optical amplifier shown in FIG. 6. In FIG. 4, a maximum variation of an output is 9.5 dB depending on a wavelength of an input signal. However, referring to FIG. 9, only a variation of about 0.8 dB appears in the FBG-inserted L-band optical amplifier shown in FIG. 6.

The following description concerns various structures of an L-band optical amplifier for re-injecting backward ASE to EDF.

Figure 10:
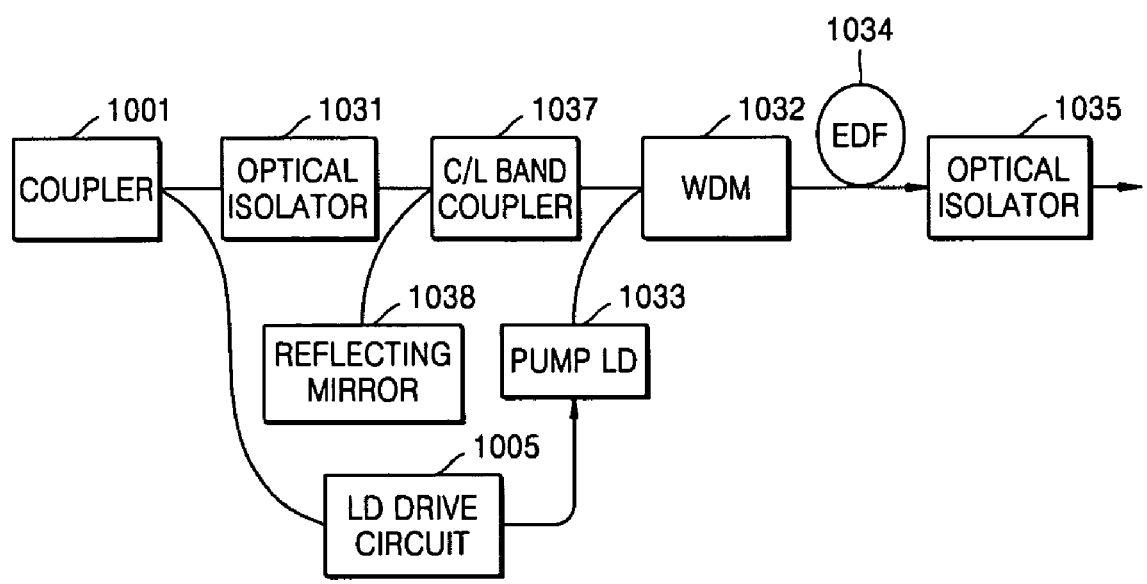
FIG. 10 is a block diagram of an L-band optical amplifier according to a second embodiment of the present invention.

FIG. 10 is a block diagram of an L-band optical amplifier according to a second embodiment of the present invention. In the second embodiment of the present invention, instead of the FBG 637 shown in FIG. 6, a C/L-band coupler 1037 and a reflecting mirror 1038 are used to re-inject backward ASE to an EDF 1034. When simultaneously receiving a C-band optical signal and an L-band optical signal, the C/L-band coupler 1037 allows only the C-band optical signal to be transmitted through one side, i.e., a C-band port, and only the L-band optical signal to be transmitted through another side, i.e., an L-band port.

Figure 11:
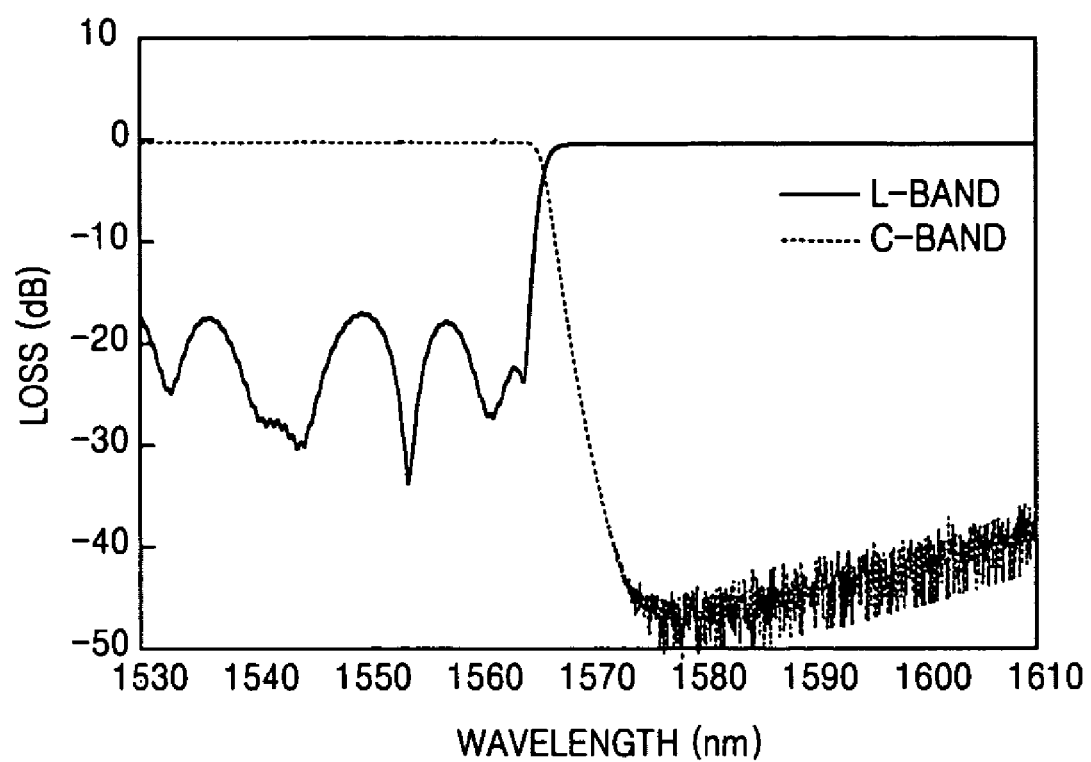
FIG. 11 illustrates an example of a transmission spectrum of a C/L-band coupler.

FIG. 11 illustrates an example of a transmission spectrum of the C/L-band coupler 1037. In FIG. 11, a dotted line expresses a transmission spectrum at the C-band port, and a solid line expresses a transmission spectrum at the L-band port. The L-band port of the C/L-band coupler 1037 is connected to an optical isolator 1031, and the C-band port thereof is connected to the reflecting mirror 1038. Backward ASE generated by the EDF 1034 travels to the reflecting mirror 1038 via the C/L-band coupler 1037 and is then reflected by the reflecting mirror 1038 to be re-injected to the EDF 1034. As a result, a gain difference depending upon a wavelength can be reduced. A tunable filter may be further provided in front of the reflecting mirror 1038 to select a wavelength of backward ASE to be re-injected to the EDF 1034, and a variable optical attenuator may be further provided in front of the reflecting mirror 1038 to adjust an optical power of backward ASE to be re-injected to the EDF 1034.

Figure 12:
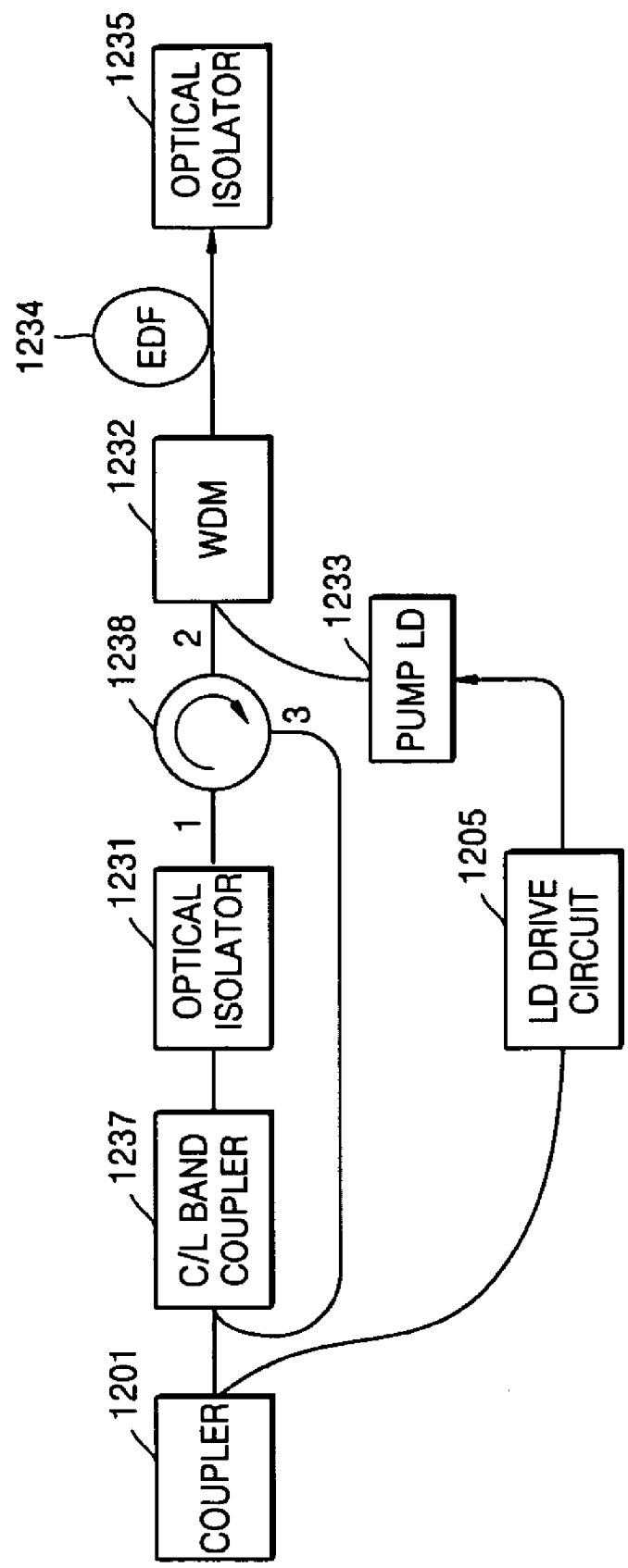
FIG. 12 is a block diagram of an L-band optical amplifier according to a third embodiment of the present invention.

FIG. 12 is a block diagram of an L-band optical amplifier according to a third embodiment of the present invention. A circulator 1238 is used to feed back backward ASE to an EDF 1234. The circulator 1238 is an optical element having directionality. In the circulator 1238, light input through a port 1 can be output through a port 2 but cannot output through a port 3 while light input through the port 2 can output through the port 3 but cannot output through the port 1. The circulator 1238 is inserted between an optical isolator 1231 and a WDM 1232 so that backward ASE passed through the WDM 1232 is transmitted to a C-band port of a C/L-band coupler 1237. Thereafter, the backward ASE is output through a common port of the C/L-band coupler 1237 and then fed back to the EDF 1234 via the optical isolator 1231. A tunable filter may be further provided between the C/L-band coupler 1237 and the circulator 1238 to select a wavelength of the re-injected backward ASE, and a variable optical attenuator may be further provided to adjust an optical power of the re-injected backward ASE.

As described above, according to the present invention, an L-band optical amplifier adjusts a pump power as a power of input signal using feed-forward gain control and simultaneously re-injects backward ASE to EDF, thereby maintaining a gain constant independent of a power or a wavelength of the input signal. In such L-band optical amplifier of the present invention, an output of signal changes very slightly even if an input power and an input wavelength change instantaneously. In other words, a gain-controlled optical amplifier of the present invention is used in the L-band and provides a stable and uniform output in all states.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical amplifier comprising:
   a pump light source which outputs pump light;
   a wavelength division multiplexer which multiplexes an input signal with the pump light;
   an optical fiber which amplifies the input signal using the pump light;
   a reflecting mirror; and
   a C/L-band coupler which comprises a C-band port and an L-band port, wherein a C-band signal passes through the C-band port and an L-band signal passes through the L-band port, the L-band port being connected to the input signal, the C-band port being connected to the reflecting mirror,
   wherein backward amplified spontaneous emission (ASE) generated by the optical fiber travels to the reflecting mirror via the C/L-band coupler and is then reflected by the reflecting mirror to be re-injected to the optical fiber.

2. The optical amplifier of claim 1, further comprising a tunable filter in front of the reflecting mirror to select a wavelength of the re-injected backward ASE.

3. The optical amplifier of claim 1, further comprising a variable optical attenuator in front of the reflecting mirror to adjust a power of the re-injected backward ASE to the optical fiber.

4. The optical amplifier of claim 1, further comprising:
   a coupler which divides and outputs the input signal at a predetermined ratio; and
   a drive unit which receives a portion of the input signal divided by the coupler and controls a power of the pump light generated by the pump light source according to a power of the received portion of the input signal.

5. An optical amplifier comprising:
   a pump light source which outputs pump light;
   a wavelength division multiplexer which multiplexes an input signal with the pump light;
   an optical fiber which amplifies the input signal using the pump light;
   a C/L-band coupler which comprises a C-band port and an L-band port, wherein a C-band signal passes through the C-band port and an L-band signal passes through the L-band port; and
   a circulator which is provided between the C/L-band coupler and the wavelength division multiplexer,
   wherein backward amplified spontaneous emission (ASE) generated by the optical fiber is input to the C-band port of the C/L-band coupler via the wavelength division multiplexer and the circulator and then output through a common port of the C/L-band coupler to be re-injected to the optical fiber via the circulator.

6. The optical amplifier of claim 5, further comprising a tunable filter between the C/L-band coupler and the circulator to select a wavelength of the the re-injected backward ASE to the optical fiber.

7. The optical amplifier of claim 5, further comprising a variable optical attenuator between the C/L-band coupler and the circulator to adjust a power of the re-injected backward ASE to the optical fiber.

8. The optical amplifier of claim 5, further comprising:
   a coupler which divides and outputs the input signal at a predetermined ratio; and
   a drive unit which receives a portion of the input signal divided by the coupler and controls a power of the pump light generated by the pump light source according to a power of the received portion of the input signal.

* * * * *